(12) United States Patent
Behl et al.

(10) Patent No.: US 12,464,002 B2
(45) Date of Patent: Nov. 4, 2025

(54) MICROSERVICES ANOMALY DETECTION

(71) Applicant: CITIBANK, N.A., New York, NY (US)

(72) Inventors: Sunny Behl, Irving, TX (US);
Hariharan Badrinathan, Tamilnadu (IN)

(73) Assignee: CITIBANK, N.A., New York, NY (US)

( * ) Notice: Subject to any disclaimer, the term of this patent is extended or adjusted under 35 U.S.C. 154(b) by 79 days.

(21) Appl. No.: 18/369,394

(22) Filed: Sep. 18, 2023

(65) Prior Publication Data

US 2024/0364724 A1    Oct. 31, 2024

Related U.S. Application Data

(63) Continuation-in-part of application No. 18/239,020, filed on Aug. 28, 2023, now Pat. No. 12,095,797, which is a continuation of application No. 18/138,883, filed on Apr. 25, 2023, now Pat. No. 11,743,281.

(51) Int. Cl.
     *H04L 9/40*      (2022.01)

(52) U.S. Cl.
     CPC ...... *H04L 63/1425* (2013.01); *H04L 63/1441* (2013.01); *H04L 63/20* (2013.01)

(58) Field of Classification Search
     CPC .. H04L 63/1425; H04L 63/1441; H04L 63/20
     USPC .......................................................... 726/23
     See application file for complete search history.

(56) References Cited

U.S. PATENT DOCUMENTS

| | | | |
|---|---|---|---|
| 11,509,674 B1* | 11/2022 | Beauchesne | H04L 63/1425 |
| 11,575,697 B2* | 2/2023 | Palani | G06N 3/088 |
| 11,743,281 B1* | 8/2023 | Behl | H04L 41/16 |
| | | | 726/22 |
| 12,182,670 B1* | 12/2024 | Beauchesne | H04L 63/1416 |
| 12,192,220 B1* | 1/2025 | Ahsan Ishtiaque | ......... |
| | | | H04L 63/1425 |

(Continued)

OTHER PUBLICATIONS

International Search Report and Written Opinion of the International Searching Authority issued in PCT Application No. PCT/US2024/026032, mailed Jul. 24, 2024, 8 pages.

(Continued)

*Primary Examiner* — Badri Champakesan
(74) *Attorney, Agent, or Firm* — Foley & Lardner LLP

(57) ABSTRACT

Presented herein are system and methods for countermeasures to address anomalies in microservices. A server having one or more processors coupled with memory may receive a first plurality of metrics from a defined set of microservices for a function. The server may apply the first plurality of metrics to an ensemble of anomaly detection models to generate a plurality of classifications. Each classification may indicate the first plurality of metrics as one of anomalous or normal from a respective model of the ensemble of anomaly detection models. The server may identify a majority of the plurality of classifications as corresponding to an anomaly event. The server may determine, responsive to identifying the majority, that at least one of the first plurality of metrics satisfies a criterion of a policy of a plurality of policies. The server may perform a countermeasure identified by the policy to address the anomaly event.

18 Claims, 10 Drawing Sheets

(56) References Cited

U.S. PATENT DOCUMENTS

| | | | | |
|---|---|---|---|---|
| 2017/0063905 | A1* | 3/2017 | Muddu | G06N 5/022 |
| 2018/0343277 | A1* | 11/2018 | Drihem | H04L 63/1441 |
| 2019/0057268 | A1* | 2/2019 | Burge | G06V 10/82 |
| 2019/0068627 | A1* | 2/2019 | Thampy | H04L 63/1425 |
| 2020/0387833 | A1* | 12/2020 | Kursun | G06N 20/20 |
| 2021/0058424 | A1* | 2/2021 | Chang | G06F 11/3409 |
| 2021/0200612 | A1* | 7/2021 | Martyanov | G06F 40/279 |
| 2021/0281592 | A1* | 9/2021 | Givental | G06N 20/10 |
| 2022/0172037 | A1* | 6/2022 | Kang | G06N 3/044 |
| 2022/0224723 | A1* | 7/2022 | Crabtree | H04L 63/20 |
| 2023/0036917 | A1* | 2/2023 | Meschiari | G06N 20/00 |
| 2023/0124621 | A1* | 4/2023 | Umesh | G06F 21/552 |
| | | | | 726/23 |
| 2023/0208876 | A1* | 6/2023 | Jung | H04L 63/1441 |
| | | | | 726/23 |
| 2023/0319083 | A1* | 10/2023 | Torres Dho | G06N 20/10 |
| | | | | 726/23 |

OTHER PUBLICATIONS

Other USPTO Comm. with Refs. on US Dtd Aug. 14, 2024.

* cited by examiner

Record new knowledge article

Select Organization/LOB ▽ | Enter Application Name | Select Category ▽

Knowledge article details

Enter article title*

☰Source B I S |Iₓ| ✂ 📋 📋 📋 📋 📋 ↶ ⌖ ABC▽ ⌖ ⌖ " ⌖ ⌖ | 🔗 🔗 🔗 | 🖼 ▦ ☰ Ω
Styles ▽ Format ▽ ✖

Enter article/problem description

Knowledge Article     Items per page 5 ▽     1-5 of 67 < >

1. Webpages Clocking or Freezing
Created on 03-02-2023 by John Doe 2        0        4
   Answer   Reference Link   Helpful Page loading extremely slow. Check the network tab for slow call JS 2. ISSUE
Created on 03-03-2023 by John Doe 1        0        3
   Answer   Reference Link   Helpful A virtual account number is a temporary token used in place of permanent account number. A user may provide a virtual account number to conduct a purchase, thereby keeping their actual account information secure.

3. Mobile biometirc login down
Created on 03-03-2023 by Jane Doe 1        1        7
   Answer   Reference Link   Helpful Transmit is a security solution for risk management. Transmit is heavily integrated into various high risk functionalities of application, Mobile for login authentication. Transmit servers are being monitored via amp and its health is displayed as OK and NOT OK based on interpreting the data collected from transmit server response

MICROSERVICES ANOMALY DETECTION

CROSS REFERENCE TO RELATED APPLICATIONS

The present application claims priority under 35 U.S.C. 120 as a continuation-in-part of U.S. patent application Ser. No. 18/239,020, titled "MICROSERVICES ANOMALY DETECTION," filed Aug. 28, 2023, which claims priority under 35 U.S.C. § 120 as a continuation of U.S. patent application Ser. No. 18/138,883, titled "MICROSERVICES ANOMALY DETECTION," filed Apr. 25, 2023, now U.S. Pat. No. 11,743,281, each of which is incorporated by reference in their entireties.

TECHNICAL FIELD

This application generally relates to anomaly detection. In particular, the present application relates to detection of anomalies in microservices.

BACKGROUND

In a computer networked environment, an instrumentation service can evaluate various measured metrics using anomaly detection techniques for anomalies in individual nodes of the network or communications among nodes. Anomaly detection techniques may lead to over-counting (e.g., false positives) or under-counting (e.g., false negatives) of anomalies. Over-counting may result in the service making too many detections and sending too many notices of anomalies to a system administrator. The system administrator may be overwhelmed with alerts regarding false positive anomalies and may be unable to check each, thereby nullifying the efforts of the service. Conversely, under-counting of anomalies may result in issues in the networked environment remaining unchecked. Either result may lead to an increase in issues as ignored anomalies exacerbate any remaining problems in the environment.

SUMMARY

Disclosed herein are systems and methods for detecting anomalies in microservices. A service can receive metrics related to performance of a microservice from a multitude of microservices. Each microservice can perform a specific function for an application. The service can evaluate the metrics received from each microservices for anomalies using an ensemble of anomaly detection models. If a majority of the ensemble indicates an anomaly, the service may further check the classification according to a set of rules. If the classification of the anomaly satisfies the set of rules, the service can provide to an administrator of the microservice an alert of the anomaly. The administrator can then take an appropriate action in relation to the anomaly to address potential issues.

There are many technical shortcomings associated with microservice anomaly detection, such as false positives and an overwhelming amount of alerts for an administrator to handle. From the perspective of the service, a service lacks the ability to identify and classify anomalies based on type of error, or time of occurrence, among others. Furthermore, the quantity of false positives and the interdependence of some microsystem monitoring systems would make instituting such a classification system innately erroneous. A large amount of false positive anomalies can further provide a hindrance to a system administrator. There may be no trackers for these alerts that measure the number of true alerts and false alarms. The system administrator may have to manually sort through all alerts to identify the true anomalies from the false. While the deterioration of any one of these microservices may not cause any critical incidents immediately, when unattended for a prolonged period of time anomalies may build up and may start having effects on the business functionalities like slow response or increased failures in the business transactions.

To address these and other technical challenges, the service receiving the metrics may monitor the performance of each microservice independently. The service may collect historical metrics to develop an ensemble of machine learning models (e.g., Isolation Forest, density-based spatial clustering of applications with noise (DBSCAN), multivariate Gaussian distribution model) in order to more accurately detect anomalies. The service may use the ensemble to create classifications of the metrics received from each microservice. The service may then determine whether a majority of the models of the ensemble detect an anomaly of each classification. The service uses a set of rules to determine whether to suppress classifications of microservices outside of a range of anomaly detection to reduce the occurrence of false positives.

With the detection of anomalies using the ensemble of models and the set of rules, the service can identify which countermeasure to take to address the anomaly. For example, if the metrics indicate that a number of affected instances of microservices are less than a threshold number, the service can trigger an automated self-healing process by restarting the affected microservices. On the other hand, if the metrics indicate that the number of affected instances is greater than or equal to the threshold number, the service can provide an alert notification to an administrator of the system. The alert can be received by one or more system administrators or displayed on a dashboard. The alert may include an identification (e.g., a link) of a web document for additional information associated with addressing the anomaly. The metrics, suppressed classifications and microservices, and anomalous information can be stored at any time and can further be used to continuously train each model of the ensemble to improve precision and accuracy of the ensemble and each individual model.

In this manner, the service may use the ensemble of machine learning modes to reduce false positives at several points (e.g., at modeling, classification, and suppression). Furthermore, classification of metrics by the models can create a history of anomalous microservices or metrics. This reduction in false positives and classifications of metrics and selection of countermeasures can provide concise and useful information to a system administrator, as opposed to unwieldly numbers of false positives to sort through. Furthermore, a microservice can be more efficiently serviced in the event of an anomaly, by noticing trends related to anomalous behavior as well as more concisely pinpointing the type of anomaly the microservice is experiencing. This can set up a framework to monitor the performance of critical microservices continuously and trigger alerts proactively whenever the microservices metrics look anomalous. Streamlining the diagnosis of problematic microservices can reduce network congestion, such as bandwidth consumed by malfunctioning microservices. Moreover, this service can reduce overall computational resources spent on malfunctioning microservices by more quickly targeting their failures and thereby simplifying rectification of the issue at hand.

Aspects of the present disclosure are directed to systems, methods, and non-transitory computer readable media for detection of anomalies in microservices. A server may receive a first set of metrics from a microservice of a set of microservices. Each of the set of microservices may be configured to provide a respective function for an application independently from other microservices of the set of microservices. The server may apply the first set of metrics to an ensemble of anomaly detection models for the microservice to generate a set of classifications. Each of the set of classifications can indicate the first set of metrics as one of anomalous or normal from a respective model of the ensemble of anomaly detection models. The ensemble of anomaly detection models can be trained using a second set of metrics from the microservice. The server may identify a majority of the set of classifications generated by the ensemble of anomaly detection models as indicating the first set of metrics as anomalous. The server may determine, responsive to identifying the majority of the set of classifications as anomalous, that at least one of the first set of metrics satisfies a respective threshold for the microservice. The server may generate an alert to indicate an anomaly event in the microservice configured to the function for the application, in response to determining that at least one of the first set of metrics satisfies the respective threshold.

In some embodiments, the server may determine, responsive to identifying the majority of the set of classifications as anomalous, that the first set of metrics satisfies a rule to avoid false positives. The server may suppress the alert to indicate the anomaly event in response to determining that the first set of metrics satisfies the rule to avoid false positives. In some embodiments, the server may determine, responsive to identifying the majority of the set of classifications as anomalous, that the first set of metrics does not satisfy a rule to avoid false positives. The server may maintain the alert to indicate the anomaly event in response to determining that the first plurality of metrics does not satisfy the rule to avoid false positives.

In some embodiments, the server may identify an addition of the microservice to the set of microservices for the application. The server may train the ensemble of anomaly detection models individually in accordance with unsupervised learning using the second set of metrics from the microservice aggregated over a time period, prior to the first set of metrics. In some embodiments, the server may suppress, responsive to identifying less than the majority of the set of classifications as anomalous, generation of the alert to indicate the anomaly event in the microservice.

In some embodiments, the server may determine the respective threshold for the microservice to compare with the at least one of the first set of metrics over a first time period, based on the second set of metrics over a second time period. In some embodiments, the server may select, from a set of time periods corresponding to a set of tier levels, a time period over which to aggregate the first set of metrics from the microservice, in accordance with a tier level for the microservice. In some embodiments, the server may apply log data for the microservice to an exception detection model to determine at least one of the set of classifications for the microservice.

In some embodiments, generating the alert further includes generating a message to indicate, to an administrator device for the set of microservices, the anomaly event for the respective function for the application corresponding to the microservice. In some embodiments, the server may provide, for presentation on a dashboard interface, information based on at least one of (i) the application, (ii) the microservice, (iii) the first set of metrics, (iv) the set of classifications, or (v) the alert to indicate the anomaly event.

Other aspects of the present disclosure are directed to systems, methods, and non-transitory computer readable media for performing countermeasures to address anomalies in microservices. A server having one or more processors coupled with memory may receive a first plurality of metrics over a first time period from a defined set of microservices for a function. The server may apply the first plurality of metrics to an ensemble of anomaly detection models to generate a plurality of classifications. Each of the plurality of classifications may indicate the first plurality of metrics as one of anomalous or normal from a respective model of the ensemble of anomaly detection models. The ensemble of anomaly detection models is trained using a second plurality of metrics over a second time period. The server may identify a majority of the plurality of classifications as corresponding to an anomaly event in the defined set of microservices. The server may determine, responsive to identifying the majority of the plurality of classifications as corresponding to the anomaly event, that at least one of the first plurality of metrics satisfies a criterion of a policy of a plurality of policies. Each of the plurality of policies may identify a respective countermeasure to address the anomaly event. The server may perform a countermeasure identified by the policy to address the anomaly event in the defined set of microservices for the function.

In some embodiments, the server may determine that (i) a number of instances of the defined set of microservices affected by the anomaly event is less than a first threshold number and (ii) a total number of instances of the defined set of microservices is greater than or equal to a second threshold number, in accordance with the criterion of the policy. In some embodiments, the server may perform the countermeasure including a restart of the defined set of microservices without approval from an administrator.

In some embodiments, the server may determine that (i) a number of instances of the defined set of microservices affected by the anomaly event is greater than a first threshold number and (ii) a total number of instances of the defined set of microservices is less than a second threshold number, in accordance with the criterion of the policy. In some embodiments, the server may perform the countermeasure to provide an alert message identifying the anomaly event to prompt an administrator to invoke restarting of the defined set of microservices.

In some embodiments, the server may determine that (i) a number of instances of the defined set of microservices affected by the anomaly event is greater than a threshold number and (ii) a time elapsed since a restarting of the defined set of microservices is less than a threshold time, in accordance with the criterion of the policy, in accordance with the criterion of the policy. In some embodiments, the server may perform the countermeasure to provide an alert message identifying the anomaly event to prompt the administrator for examination.

In some embodiments, the server may apply a natural language processing (NLP) algorithm to a log data identifying a plurality of events associated with the defined set of microservices in carrying out the function. In some embodiments, the server may identify, from applying the NLP algorithm to the log data, an exception in at least one of the plurality of events of an exception type associated with the anomaly event. In some embodiments, the server may generate, for the plurality of classifications, a classification to identify the exception in the defined set of microservices as one of anomalous or normal based on the exception type.

In some embodiments, the server may receive, via a user interface, a web document to include in a plurality of web documents maintained on a database, each of the plurality of web documents identified using at least one of (i) an anomaly type, (ii) one or more microservices, or (iii) a function type. In some embodiments, the server may select, responsive to identifying the majority of the plurality of classifications as corresponding to the anomaly event, a web article from a plurality of web documents on the database based at least one of: (i) an anomaly type of the anomaly event, (ii) the defined set of microservices, or (iii) the function. In some embodiments, the server may perform the countermeasure to provide an identification of the web document.

In some embodiments, the server may determine, responsive to identifying the majority of a second plurality of classifications as corresponding to a second anomaly event, that none of a third plurality of metrics satisfies any criterion of any policy of the plurality of policies. In some embodiments, the server may refrain from performing any countermeasure identified by any policy of the plurality of policies, responsive to determining that none of a third plurality of metrics satisfies any criterion. In some embodiments, the defined set of microservices may include a group of microservices invoked in response to carry out a function.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and, together with the specification, explain the subject matter of the disclosure.

FIGS. 7A-C illustrate screenshots of user interfaces to access web documents providing information on anomalies in microservice.

DETAILED DESCRIPTION

Figure 1:
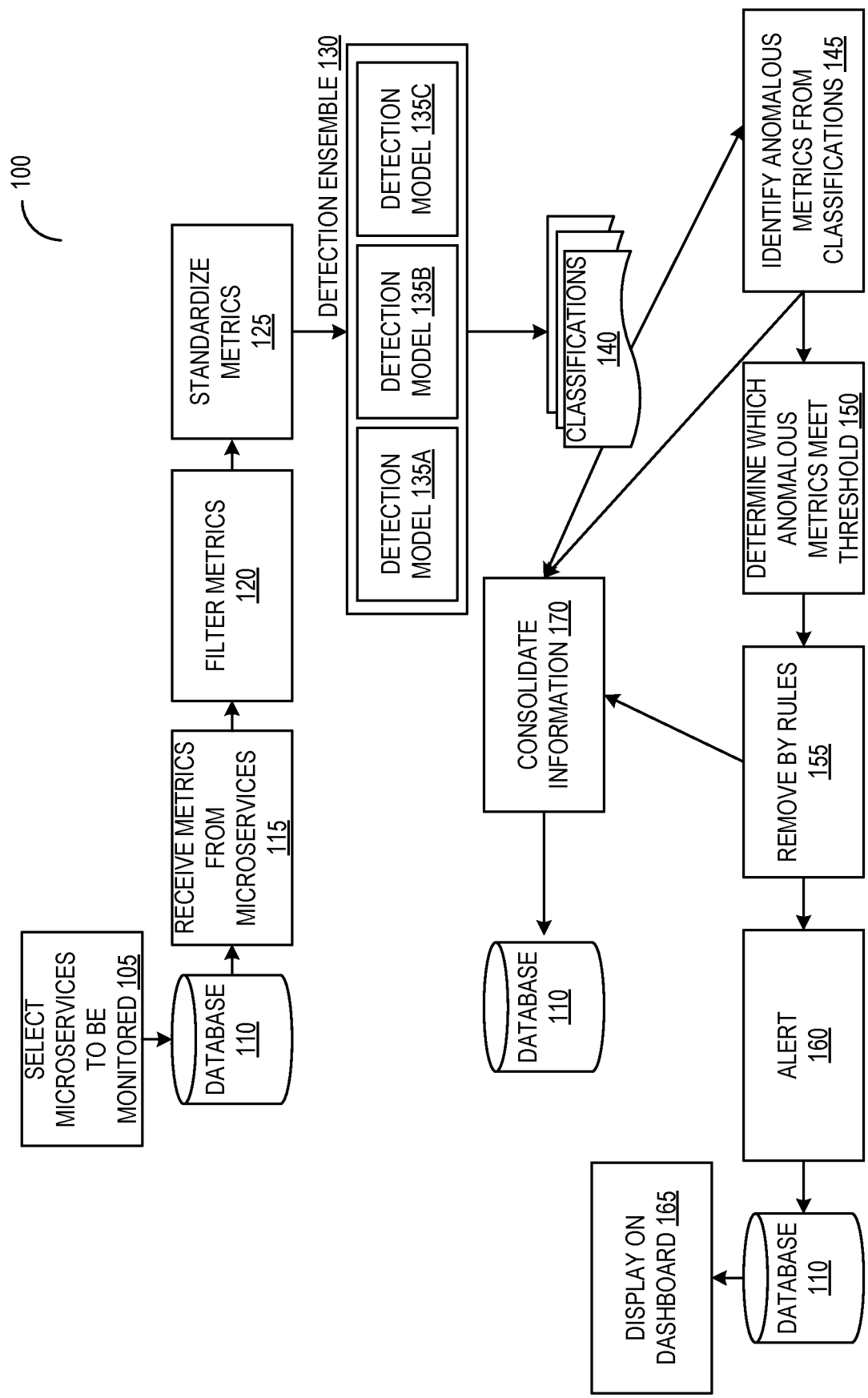
FIG. 1 illustrates a flow diagram of an example process for microservice anomaly detection in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of microservice anomaly detection. A server can receive a set of metrics from one or more microservices. The service may collect historical metrics to develop an ensemble of machine learning models in order to more accurately detect anomalies. The service may use the ensemble to create a classification of the metrics received by each microservice. The service may then determine if a majority of the models of the ensemble detect an anomaly of each classification and may suppress classifications or microservices outside of a range of anomaly detection. Subsequent to the detection of anomalous metrics within a classification, the service can generate and transmit an alert. This detection technique can reduce false positives at several points. Furthermore, classification of metrics by the models can create a history of anomalous microservices or metrics. In this manner, a microservice can be more efficiently serviced in the event of an anomaly, through reduction in false positives and classifications of metrics. This can increase overall functionality of the application as well as reduce computing resources.

FIG. 1 depicts a flow diagram of an example process 100 for microservice anomaly detection. The process 100 may include several operations (operations 105-170) to be performed by a service that receives a set of metrics from one or more microservices (operations 105-115), processes the metrics (operations 120-125), classifies the metrics (operations 130-140), determines anomalies (operations 145-155), and generates an alert and stores the data (operations 160-170). The process 100 may contain more or fewer operations than depicted herein.

In operation 105, microservices are selected to be monitored. The microservices can be independently operating microservices which serve a function for an application. The microservices selected to be monitored can be maintained in a master list. The microservices can be selected by at least a user (such as a system admin) or by an automatic system for monitoring such as a system that can accept requests and automatically update the master list. Microservices can be added or removed from the master list at any time, such as periodically (e.g., daily, weekly), with the addition of a new metric, with the disablement of a metric, or with the determination that a metric is operating anomalously.

In operation 115, the server receives a set of metrics from the one or more microservices. The server can receive the set of metrics by retrieving them from a database 110, from the microservices individually or collectively, or from a network. Likewise, the database or microservices can transmit the metrics to the server. The metrics can include information pertaining to the operation and functionality of a microservice. Each microservice can send metrics indicative of performance. The server can receive metrics at least periodically, in response to a change in a microservice, by a push from an administrator. Metrics can be aggregated or collected by the server for a period of time, such as weeks, months, or years, among others. The system can receive the metrics as a data object, such as a list, table, or JSON object, among others.

In operation 120, the server filters the metrics. The server can filter the metrics according to one or more filter criteria, including at least average response time, calls per minute, errors per minute, or full garbage collection pause time, described herein. The server can filter the metrics based on time received. Filtering can also include removing null values from the metrics. For example, null values may occur when a system update is installing, or when a microservice is taken offline for a period of time. The system can filter out these null values within the metrics as to at least prevent data skewing.

In operation 125, the server standardizes or normalizes the metrics. The server can standardize the metrics associated with each microservice individually, as a group or as subgroups. The metrics may be associated with a group of microservices invoked when carrying out a function, associated applications, or transactions, among others. Standardizing the data can refer to altering the metrics to reflect a specific statistical mean or variance. For example, standardizing the data can refer to manipulating the metrics to exhibit a mean of 0 and a standard deviation of 1. In some embodiments, standardizing the metrics can enable easier calculations and comparison across metrics.

Using the metrics, an ensemble 130 of detection algorithms may be created. The detection ensemble can include a multitude of different models (e.g., models 135A-C). The ensemble 130 can enable an evaluation of the metrics by each model to be amalgamated to derive a final estimate, and a prediction, among others. The ensemble can build a generalized model by reducing bias that could be introduced by using only a single model. Each model 135 of the ensemble acts upon the metrics. The models can include models such as DBSCAN, Isolation Forest, or multivariate Gaussian distribution and can perform one or more functionalities on the set of metrics to prepare them for classification. The models can include models different from or in addition to the models listed herein. Each model can evaluate the metrics to determine if a microservice is suffering from an anomaly.

In operation 140, the metrics are classified. The metrics can be classified into one or more classifications. For example, classifications can include "anomalous" and "normal." Metrics of the set of metrics can be classified as anomalous or normal. The metrics of a microservice being classified as anomalous or normal can indicate that the microservice that includes the set of metrics is anomalous or normal, respectively. The classifications can be stored in the database 110.

In operation 145, the server identifies anomalous metrics from the classifications. The server can determine anomalous metrics from the classifications created in operation 140 by combining the classifications in the ensemble. The classifications from each model can be combined at least additively, with a weight assigned to each model, or by a majority voting means. For example, in an ensemble consisting of three models, if two of the models determine a metric to be indicative of an anomaly, the ensemble can classify the metric as anomalous.

In operation 150, the server determines which anomalous metrics meet a threshold. Thresholds can be established for each metric of the set of metrics, for a subset of the metrics, or for the combination of metrics for each microservice. A threshold can be determined from collected metrics over a period of time. For example, a threshold can be determined from metrics collected from a microservice over a ten-week period. For example, a threshold can be set at a 95% percentile of the anomalous metrics. That is to say, identified anomalous metrics that are within the 5% historically least anomalous can be considered to not meet the threshold. As a more specific example, the 95% percentile of call response time may be 10 ms. In this example, any metrics indicating a call response time of less than 10 ms do not meet the threshold. The server can disregard metrics not meeting the threshold as false positives.

In operation 155, the server removes metrics which do not meet a rule. The server can determine if the metrics which have met the threshold also meet a rule of a set of rules. The server can remove, suppress, or disregard metrics which do not meet the rule as false positives. A rule can be, for example, that all metrics except "errors per minute" are within the threshold and the "errors per minute" value is less than ten. A rule can be, for example, that "errors per minute" is less than 1% of the "calls per minute" value. A rule can be, for example, that all metrics except "average response time" are within threshold and "average response time" is less than twice its mean value. Other rules can exist within the set of rules. With the removal of anomalies based on not meeting a rule, the server can generate an alert.

In operation 160, the server generates an alert for transmittal. The server can generate an alert for transmission to a database, to an administrator, or for display at least. The alert can be an email, an SMS message, or another notification means. The alert can be stored in the database 110. The alert can indicate to an administrator that a microservice has been identified as anomalous. The alert can include information relating to the metrics, model determinations, and classifications, as well as other information contained within the system.

In operation 165, the server displays the alert on a dashboard. The dashboard can be a graphical user interface for informing an administrator of a microservice anomaly. The dashboard can display metrics, listings of microservices, times of alerts, as well as other information pertinent to the system. In operation 170, the server consolidates the information. The server can amalgamate information related to the system at any time, such as in response to new information or periodically. Information can be organized into a data structure such as JSON data structure, trees, tables, lists. Various information may be stored in a database. Information stored can include at least normal metrics, anomalous metrics, classifications, lists of microservices, alert data, or thresholds. The system can access the database at any time to store information, such as periodically, responsive to new information (e.g., a new microservice or new metrics), or manually.

Figure 2:
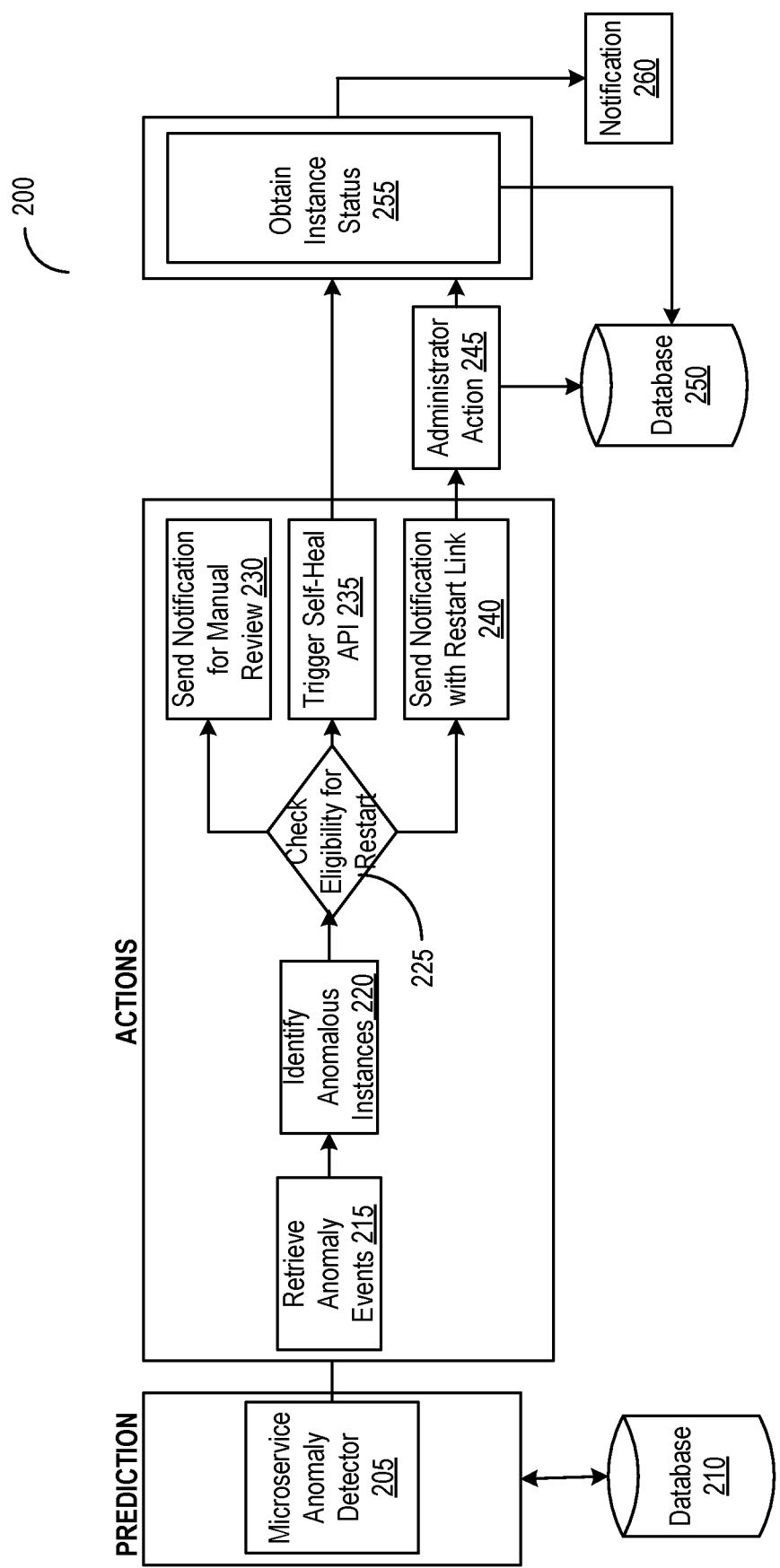
FIG. 2 illustrates a flow diagram of an example process for enforcing countermeasures to address detected anomalies in microservices in accordance with an illustrative embodiment.

FIG. 2 illustrates a flow diagram of a process 200 for enforcing countermeasures to address detected anomalies in microservices. The process 200 may include several operations (operations 205-260) to be performed by a service. The process 200 may contain more or fewer operations than depicted herein. Under the process 200, in operation 205, the service may run a microservice anomaly detector using a set of metrics retrieved from a database 210. The set of metrics may have been aggregated from an individual microservice or a group of microservices invoked when carrying out a function, one or more applications, or a transaction, among others. The microservice anomaly detector may use an ensemble of anomaly detection algorithms to determine whether the set of metrics for the microservice are anomalous or normal.

In operation 215, the service may retrieve anomaly events in the microservices from the microservice anomaly detector. The service may also fetch the set of metrics associated the microservice affected by the anomaly event. In operation 220, the service may identify instance of the microservices impacted by the anomaly event. Each instance may correspond to a copy of the microservice running in a network environment (e.g., on a cloud network environment). The instances of the microservices may be used to carry out the function, application, or transaction.

In operation 225, the service may check whether the microservices are eligible to be restarted based on the set of metrics aggregated for the affected microservices. To check, the service may compare the set of metrics against a set of criteria as defined by each policy. The criteria for each policy may define a set of ranges of values for the metrics and may specify which action (e.g., operations 230-240) to take when the metrics satisfy the set of criteria. The policies may be defined for a particular microservice or set of microservices or may be generally applicable over the microservices. If the set of metrics satisfy none of the criteria for any of the policies, the service may determine that the microservices are ineligible to be restarted. On the other hand, if the set of metrics satisfies the criteria for a policy, the service may determine that the microservices are eligible to be restarted and may identify the action to be performed as specified by the policy.

In operation 230, the service may send a notification for manual review by an administrator in accordance with a policy (sometimes referred herein as a further review notification (FRN)). The criteria for the policy may specify, for example, the self-heal processing (e.g., restarting) has been executed on the microservices within a defined period of time (e.g., 1 hour to 3 days), and the total number of instances impacted by the anomaly event is greater than a threshold number (e.g., 3 to 8). The criteria may also specify that none of the other policies (e.g., in operation 235 and 240). The notification may prompt the system administrator to perform a manual review of the microservices and the network environment for further diagnosis.

In operation 235, the service may trigger a self-heal process on the microservices via an application programming interface (API) in accordance with another policy (sometimes herein referred to as a straight-through processing (STP)). The criteria for the policy may specify, for example: that the self-heal processing (e.g., restarting) has not been executed on the microservices within a defined period of time (e.g., 1 hour to 3 days); the total number of instances of the microservices running are greater than to a threshold number (e.g., 5 to 10); the total number of instances impacted by the anomaly event is greater than a threshold number (e.g., 3 to 8); and the percentage of affected instances is less than a threshold percentage (e.g., 40 to 60%). The triggering of the self-heal process may restart the microservices affected by the anomaly, without additional input from the system administrator. For example, the service may restart all the microservices for a given transaction determined to be impacted by the anomaly as part of the self-heal process. The API may define functions to invoke for restarting the microservices.

In operation 240, the service may send a notification with a restart link to an administrator in accordance with yet another policy ((sometimes herein referred to as an approval-based processing (ABP)). The criteria for the policy may specify, for example: that the self-heal processing (e.g., restarting) has not been executed on the microservices within a defined period of time (e.g., 1 hour to 3 days); the total number of instances of the microservices running are less than to a threshold number (e.g., 5 to 10); the total number of instances impacted by the anomaly event is greater than a threshold number (e.g., 3 to 8); and the percentage of affected instances is less than a threshold percentage (e.g., 40 to 60%). The notification may provide a link (or other actionable item) to invoke the restart process of the affected microservices.

In operation 245, the service may identify an action by the administrator in response to receipt of the notification with the restart link. When receive, the administrator device may present the notification identifying the anomaly in the microservices services along with a link to prompt the administrator to initiate the restart process. The system administrator may conduct a separate review of the microservices and the network environment. With the identification, the service may proceed with the restart process of the impacted microservices. The service may also store and maintain an indication of the action on the database 250.

In operation 255, as the microservices are being restarted under the self-healing process, the service may monitor for status of each instance of the microservices. The status may indicate the state of the microservice with respect to the restarting process, and may, for example, identify whether the microservice is shutting down, restarting, or has completed restarting. In operation 260, upon completion of the restart, the service may send a notification to the administrator indicating the completion of the restarting of the microservices. The service may also store the statuses of the instances of the microservices with the restart.

Figure 3:
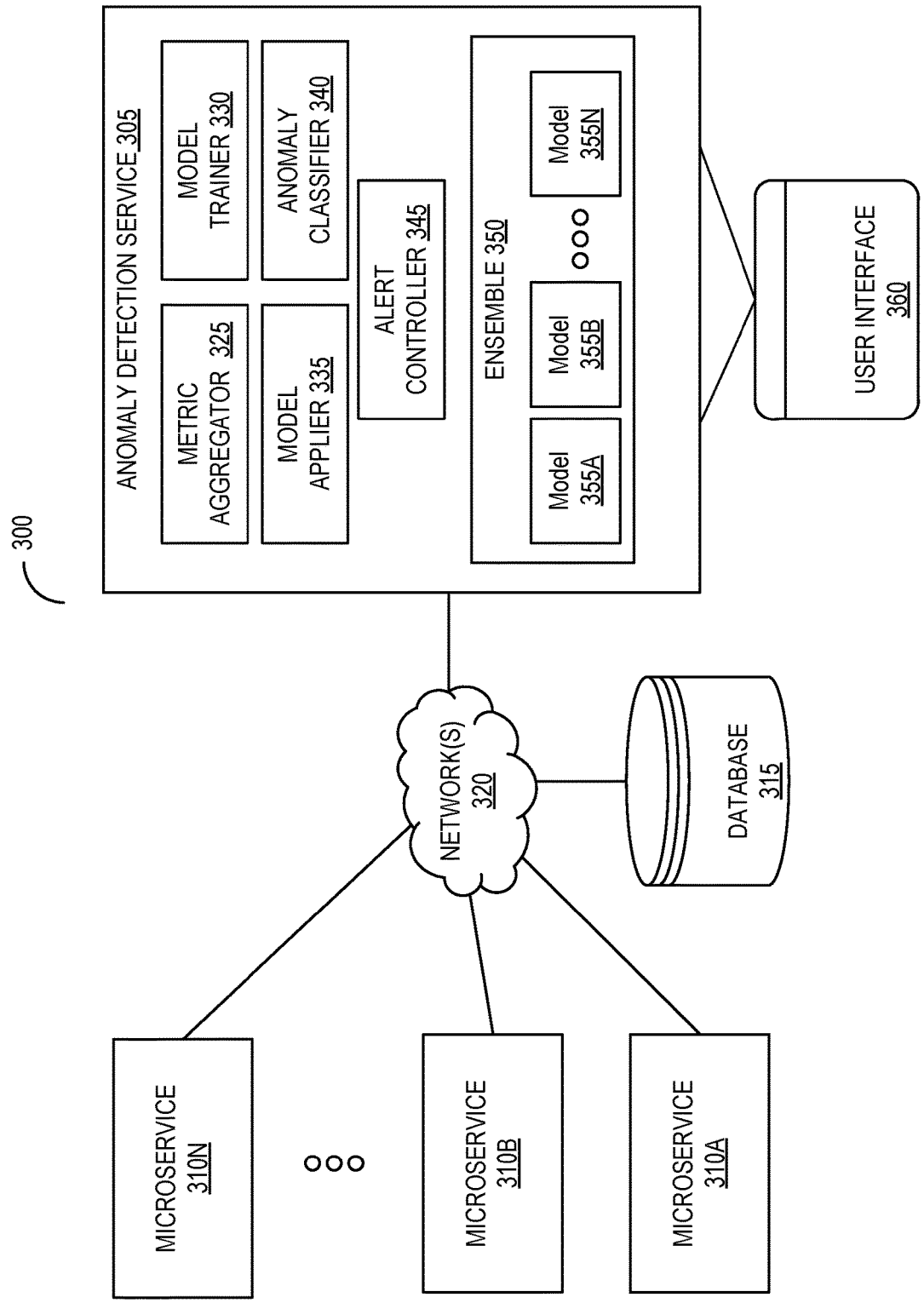
FIG. 3 illustrates a block diagram of an example system for identifying anomalies in microservices in accordance with an illustrative embodiment.

FIG. 3 depicts a block diagram of a system 300 for identifying anomalies in microservices. The system 300 may include one or more microservices 310A-N(hereinafter generally referred to as a microservice 310), at least one anomaly detection service 305, and a database 315, coupled with one another via at least one network 320. The anomaly detection service 305 may include at least one metric aggregator 325, at least one model trainer 330, at least one model applier 335, at least one anomaly classifier 340, at least one alert controller 345, and an ensemble 350, among others, and provide at least one user interface 360. The ensemble 350 may include a set of models 355A-N(hereinafter generally referred to as models 355).

Embodiments may comprise additional or alternative components or omit certain components from those of FIG. 3 and still fall within the scope of this disclosure. For example, the database 315 and the anomaly detection service 305 may be part of the same device. Various hardware and software components of one or more public or private networks 320 may interconnect the various components of the system 300. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The microservices 310 are a set of independently operating subsystems which perform a function for an application. The microservices 310 can each perform a function for the application independently of the other microservices 310. The application can be a software application operating on a user device. In this manner, one or more microservices of the microservices 310 can malfunction (e.g., not perform its function, perform its function incorrectly, or perform its function below a quality threshold) without impacting the operation of the other microservices 310. The microservices 310 can be independently monitored. In some embodiments, a set of microservices 310 can be grouped, associated, or defined in connection with carrying out at least one function, one or more applications, or at least one transaction, among others. The microservices 310 may transmit metrics to the anomaly detection service 305.

The microservice 310A can be one of the many microservices 310, each configured to provide a function for the application independently from each other. In this manner, the microservice 310A can have its own set of metrics that can indicate the functionality of the microservice 310A. The microservice 310A can malfunction independently of the many microservices 310. For example, the microservice 310A may perform below the quality threshold, perform its function incorrectly, or not perform its function at all. The set of metrics associated with the microservice 310A may indicate that the microservice 310A is malfunctioning in some capacity. The microservices 310 can each communicate with the anomaly detection service 305 to at least transmit metrics to the anomaly detection service 305.

The anomaly detection service 305 may be any computing device including one or more processors coupled with memory (e.g., the database 315) and software and capable of performing the various processes and tasks described herein. The anomaly detection service 305 may be in communication with the microservices 310, the user interface 360, the network 320, or the database 315. Although shown as a single anomaly detection service 305, the anomaly detection service 305 may include any number of computing devices. The anomaly detection service 305 may receive, retrieve, or otherwise include the set of metrics from the microservice 310A.

The anomaly detection service 305 includes several subsystems to perform the operations described herein. The anomaly detection service 305 may include a metric aggregator 325, a model trainer 330, a model applier 335, an anomaly classifier 340, an alert controller 345, or an ensemble 350 including models 355A-N. In some implementations, the metric aggregator 325 collects the metrics from each microservice 310 via the network 320. The model trainer 330 may train the ensemble 350 of models 355 using a subset of the metrics. The model applier 335 applies the model to the metrics to generate classifications of the metrics as normal or anomalous. The anomaly classifier 340 may identify that a majority of the classifications indicate that the metrics are anomalous. The alert controller 345 may determine that at least one of the metrics satisfies a threshold and may generate an alert indicating an anomaly event and may transmit that alert to a user interface 360.

Figure 4:
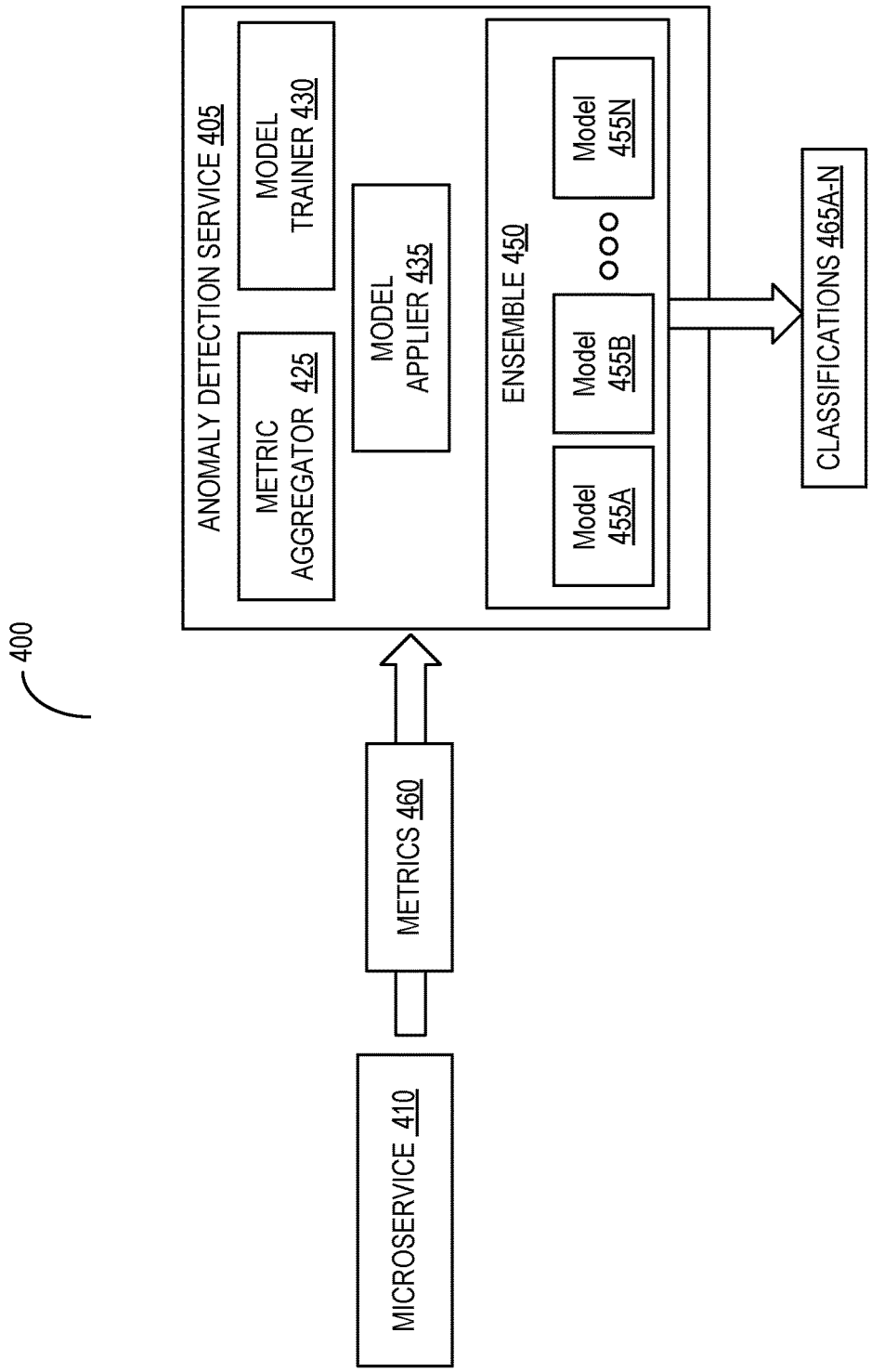
FIG. 4 illustrates a block diagram of an example system for classifying microservices as anomalous in accordance with an illustrative embodiment.

FIG. 4 depicts a block diagram of a system 400 for classifying microservices as anomalous. The system 400 may include an anomaly detection service 405 and a microservice 410. The anomaly detection service 405 may include a metric aggregator 425, a model trainer 430, a model applier 435, or an ensemble 450, among others. The ensemble 450 may include a set of models 455A-N(hereinafter models 455). Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the microservice 410, or the anomaly detection service 405) may be any computing device comprising one or more processors coupled with memory and software, and capable of performing the various processes and tasks described herein.

The metric aggregator 435 retrieves, identifies, or otherwise receives a set of metrics 460 from at least one microservice 410 (e.g., as in the depicted example) or a defined set of microservices 410. Each microservice 410 may provide its own set of metrics 460. The metrics 460 may be acquired over at least one time period during runtime mode or training mode. The metrics 460 for the runtime mode may be acquired subsequent to training. The metrics 460 may identify or include for the model applier 435 information, data, statistics, or resources relating to the performance of each microservice 410. Each set of metrics 460 may include information relating to quantities or measurements that can be used to determine an anomaly within the microservice 410. The metric aggregator 425 may store and maintain the metrics 460 on a database upon receipt. The database can be any combination of hardware and software to store information, such as the metrics 460, for the system 400. The metric aggregator 425 may access the database to write or read information, such as the metrics 460. The metric aggregator 425 may read or write other information on the database, such as log data.

The metrics 460 may include data related to the functioning or operation of a microservice 410 (or a defined set of microservices 410), such as an average response time, calls per minute, errors per minute, or full garbage collection pause time, among others. The average response time can be the mean time for the microservice 410 to respond to a call (e.g., request for performance of the microservice's function) from the application. The response time can be determined over a period of time, such as ten minutes or an hour. Calls per minute can be the total number of calls over a period of time, such as ten minutes or an hour, divided by that period of time. Errors per minute can be the total error calls during a period of time, such as ten minutes or an hour, divided by that period of time. An error call can be the microservice 410 performing its function when it has not been called, the microservice 410 failing to respond to a call, or the microservice 410 responding inadequately to a call, among others. The full garbage collection (GC) pause time can be the total GC pause time during a period of time, such as ten minutes or an hour, divided by that period of time. The garbage collection pause time can be the time when the application or operations thereof (e.g., a microservice 410) are suspended. The application can experience garbage collection pause time, for example, due to a memory of the application or the microservice 410 being full. In some embodiments, the metrics 460 may include a number of instances of the microservices 410 executing in a network environment and may identify the data related to the function the functioning or operation of the microservice 410 on a per instance basis. Any or all of these data can be included in the metrics 460.

In some embodiments, the metric aggregator 425 may retrieve, receive, or otherwise identify log data. The log data may include a record of events (e.g., transactions, operations, or function invocations) on the microservice 410. Each event may be identified by a type of function call, the microservice 410 (or the set of microservices 410), a time stamp identifying a time at which the function was invoked, an input to the function, and an output from the invocation of the function, among others. The log data may be stored periodically, such as daily or hourly, or in response to a change in the log data. The log data may also include or identify exceptions, such as a syntax exception or a null pointer exception, among others. An exception can be an error in the operation of a microservice or a defined set of microservices. For example, a syntax exception can be a parsing error during the operation of a microservice. A null pointer exception can be an error in the microservice 410 performing its duty due to a null value in a call of the function. In some embodiments, an exception may halt or stall the microservice 410 from performing its function.

The metric aggregator 425 may collect the metrics 460 periodically, at scheduled intervals, or in response to a user requesting the metrics 460. For example, the metric aggregator 425 may collect the metrics 460 at intervals of ten minutes or daily. The metric aggregator 425 may collect the metrics 460 from each microservice 410 at different times or at different intervals. For example, the metric aggregator 425 may collect the metrics 460 for a first microservice at a different interval than the metric aggregator 425 collects the metrics 460 for a second microservice.

In some embodiments, the metric aggregator 425 may determine, select, or identify a time period over which to aggregate the set of metrics 460 from the microservice 410. The time period may be identified from a set of time periods corresponding to a set of tier levels (or priority or criticality levels). Each tier level may correspond to a time period for collecting the metrics 460 from the microservice 410. For example, a first microservice may have a different tier level than a second microservice. The first microservice may have its metrics 460 aggregated by the metric aggregator 425 over a period of eight weeks, whereas the second microservice may have its metrics aggregated over a period of ten weeks. The time periods may be concurrent or non-concurrent. The tier levels may correspond to a priority of the microservice 410. In some implementations, the metric aggregator 425 may more frequently or for a longer time period collect the metrics 460 for a microservice deemed to be more critical than another microservice 410. The microservice 410 may be more critical or priority if a system admin designates it so, if the microservice 410 performs its function more frequently, if the microservice 410 is necessary for functionality of the application, among other reasons. In some implementations, each microservice 410 is assigned a tier corresponding to its priority.

The metric aggregator 425 can perform various operations on the received metrics 460'. The metric aggregator 425 may filter the metrics 460. The metric aggregator 425 may filter the metrics 460 based on information within the metric (e.g., average response time, calls per minute, etc.). For example, the metric aggregator 425 may filter for only average response time, or average response time and errors per minute. The metric aggregator 425 may filter based on time. The metric aggregator 425 may discard, or conversely, only consider, data within a specified time period. For example, the metric aggregator 425 may remove or delete null values of the metrics 460. For example, the microservice 410 may not be configured to operate during a specified period of time and may therefore return null values for calls per minute in its metrics 460 during that time period. The metric aggregator 425 may remove the null values or may aggregate only during the time period of operation for the microservice 425. The metric aggregator 425 can store the filtered metrics in the database.

As a part of the various operations the metric aggregator 425 can perform on the metrics, the metric aggregator 425 may standardize the data. For example, the metric aggregator 425 may convert the metrics 460 to standard form. Standard form can refer to a data set (e.g., the metrics 460) being manipulated to have a mean of 0 and a standard deviation of 1. For example, the metric aggregator 425 may manipulate the calls per minute, the average response time, or the errors per minute, among others, to have a mean of 0 and a standard deviation of 1. Further operations of the metric aggregator 425 can include data cleaning. Data cleaning can refer to removing duplicate records (e.g., duplicate metrics or duplicate information in the metrics). For example, the metric aggregator 425 can remove or delete duplicate records at any point. Duplicate records may occur in case of any reruns or problems in the transmission of the metrics 460 to the metric aggregator 425. The microservice 425 may identify duplicate records based at least on a timestamp of the metric 460 or an identifier of the metric 460.

In some embodiments, the metric aggregator 425 may determine, detect or otherwise identify a removal of the microservice 410 to the set of microservices for the application. The metric aggregator 425 may identify the removal of the microservice 410 by a routine inventory of the set of microservices, by not receiving metrics from the microservice 410 for a period of time, by querying for the metrics 460 of the microservice 410, by a system admin indicating the removal of the microservice 410, among others. The metric aggregator 425 may cease to collect the metrics 460 from the removed microservice 410.

In some embodiments, the metric aggregator 425 may determine, detect, or otherwise identify an addition of the microservice 410 to the set of microservices for the application. The metric aggregator 425 may identify the additional microservice 410 by a hello sent from the additional microservice 410, by a routine inventorying of the microservices 410, or by a system admin indicating the addition of the microservice 410, among others. The metric aggregator 425 may collect the set of metrics 460 from the additional microservice 410. In some implementations, the metric aggregator 425 may collect the metrics 460 from the additional microservice for a period of time before performing any other operations on the metrics 460 by the anomaly detection service 405.

Upon detection of the addition, the model trainer 430 may initiate or establish the ensemble 450 of anomaly detection models. The ensemble 450 may be established on a per microservice 410 basis or a per application basis. The model trainer 430 may initiate or establish one or more ensembles 450 by training the set of models 455 using the metrics 460. The use of the ensemble 450 can reduce bias imparted by using only a single model. Furthermore, the use of the ensemble 450 can generalize (e.g., make a better fit) across the multitude of microservices 410. In some implementations, each model 455 of the ensemble 450 can be trained using a second set of metrics 460 collected prior to a first set of metrics 460. For example, the metric aggregator 425 may collect a set of metrics 460 for training the models 455 prior to collecting the metrics 460 for other operations of the anomaly detection service 405. In this example, the metric aggregator 425 may collect the metrics 460 during an 8-week period for training the models 455 via the model trainer 430. The model trainer 430 may train each of the models 455 individually. The model trainer 430 may train the models 455 with unsupervised learning. Unsupervised learning can be a machine learning method which utilizes the prior-collected metrics 460 to identify patterns within the latter-collected metrics 460'.

The models 455A-N can be a multitude of different machine learning models. The models 455 can include at least DBSCAN, K Means, Agglomerative Clustering, GMM, Elliptic Envelope, Isolation Forest, multivariate Gaussian models, or exception models, among others. Each model 455 can be trained and operate independently on the metrics 460. Each model 455 can process the metrics 460 simultaneously. Examples of the models 455 of the ensemble 450 for processing the metrics 460 are detailed herein below.

An Isolation Forest (IF) model may be used as one of the models 455 of the ensemble 450 and can be built based on one or more decision trees. Isolation Forests can view an anomaly as a data point. In an Isolation Forest, randomly sub-sampled data (e.g., the metrics 460) can be processed in a tree structure based on randomly selected features. The samples located deeply within the tree can be less likely to be anomalies as they are more difficult to isolate. Similarly, the samples which end up in shorter branches can indicate anomalies as it may be easier for the tree to separate them from other observations. The algorithm associated with the Isolation Forest model can be surmised below:

1. When given a dataset, a random sub-sample of the data can be selected and assigned to a binary tree.
2. Branching of the tree can start by selecting a random feature (e.g., data of the metrics 460). Subsequently, branching can occur on a random threshold (any value in the range of minimum and maximum values of the selected feature).
3. If the value of a data point (e.g., feature) is less than a selected threshold, it goes to the left branch. Otherwise, the data point may go to the right. Accordingly, a node can be split into left and right branches.
4 This process from step 2 can be continued recursively until each data point is completely isolated or until a max depth of the binary tree (if defined) is reached.
5 The above steps are repeated to construct random binary trees.

An anomaly score can be assigned to each of the data points based on the depth of the tree required to arrive at that point. This score can be an aggregation of the depth obtained from each of the trees. In some implementations, an anomaly score of −1 can be assigned to anomalies and 1 to normal points based on the percentage of anomalies present in the data.

A Density-Based Spatial Clustering of Applications with Noise (DBSCAN) may be used as one of the models 455 of the ensemble 450. The DBSCAN model can be a data clustering algorithm. In some implementations, DBSCAN groups together data points (e.g., of the metrics 460) that are close to each other based on a distance measurement (e.g., Euclidean distance) and a minimum number of data points. It also can mark as outliers the data points that are in a low-density region. DBSCAN may be able to find arbitrary shaped clusters and clusters with noise (e.g., outliers). In other words, DBSCAN may determine that a point belongs to a cluster if that data point is close to many points from that cluster. The algorithm associated with DBSCAN can be surmised below:

1. A first point can be selected at random. A neighborhood area can be determined using a selected radius. If there are at least a minimum number of points in the neighborhood, the first point is marked as core point and a cluster formation can start. If not, the first point can be marked as noise. Once a cluster formation starts, all the points within the neighborhood of the first point can be included in the cluster. If these new points are also core points, the points that are in the neighborhood of them are also added to the cluster.
2. Then, a second point can be randomly chosen from the points that have not been visited in the previous steps. The procedure of step 1 then applies.
3. The process can terminate when all points are visited.

The multivariate Gaussian (Normal) distribution model may be used as one of the models 455 of the ensemble 450. The multivariate Gaussian distribution model can take into account how data of the metrics 460 change with other data of the metrics 460. The model can include a co-variance matrix based on the metrics 460. This model can account for the covariance between all the data of the metrics 460 by utilizing the power of the covariance matrix. This model can form a normal distribution graph of the metrics 460. The algorithm associated with the multivariate Gaussian distribution model can be surmised below:

1. Identify the mean of a set of training metrics.
2. Identify the covariance of the set of training metrics.
3. Calculate a probability of a value of the metrics 460 being equal to each and every value of the metrics 460.
4. Calculate the probability for all the values of the metrics 460. This probability value can be used to identify (either by comparing against a threshold or by probability values of all the metrics 460) the anomaly or outlier.

Natural language processing (NLP) algorithm may also be used as one of the models 455 of the ensemble 460. The NLP algorithm may accept the log data instead of or in addition to the metrics 460 and may apply any number of NLP techniques, such as information retrieval (IR), information extraction (IE), and semantic analysis, among others. The NLP model may be applied to the log data to identify exceptions, such as a checked exception, a syntax error exception, a runtime exception (e.g., arithmetic exception, null pointer, or illegal argument exception), or a custom exception, among others. For example, the exceptions may be JavaScript Object Notation (JSON) exception. In some implementations, with the identification of an exception, a separate ensemble 450 of models can be applied to the log data. The separate ensemble can include the models 455 trained with and processing the log data collected by the metric aggregator 425. These models and others not identified herein can be trained by a set of metrics 460 to operate on a latter set of metrics 460.

With the establishment of the ensemble 450, the model applier 435 applies or feeds the metrics 460 to each model 455 of the ensemble 450. In some embodiments, the model applier 435 may apply the log data to the exception detection model. At least one of the classifications 465 can be determined through the log data for the microservice 410. In feeding, the model applier 435 may input the metrics 460 into each model 455 and process the metrics 460 in accordance with the architecture and specifications of each model 455. From processing, the model applier 435 may produce, output, or otherwise generate a set of classifications 465A-N(hereinafter generally referred to as classifications 465) from the corresponding set of models 455. For example, the model applier 435 may input the metrics 460 into a feature space defined by a clustering model (e.g., one of the models 455) and find a region in which the metrics 460 reside for the output. In some embodiments, the model applier 435 may apply the NLP algorithm included in the ensemble 450 to the log data to find, determine, or otherwise identify at least one exception in the events of the log data. The exception may be identified as of a particular type of exception, such as a syntax error exception, a runtime exception (e.g., arithmetic exception, null pointer, or illegal argument exception), or a custom exception, among others.

Each of the classifications 465 can identify or indicate the metrics 460 for the microservice 410 as being anomalous or normal. Each model 455 can determine whether the microservice 410 (or the defined set of microservices 410) is experiencing or had experienced an anomaly event. An anomaly event can be correlated to the metrics 460 of the microservice 410 corresponding to the anomaly event being anomalous. Anomalous can refer to the microservice 410 (or its metrics 460 indicating thus) not performing as intended or malfunctioning. Normal can refer to the microservice 410 performing its function as intended. The classification 465 generated using the NLP algorithm applied on the log data can identify an exception and the type of exception. The presence of the exception in the classification 465 may indicate that the microservice 410 is experiencing or had the anomaly event. The absence of the exception in the classification 465 may indicate that the microservice 410 lacks the anomaly event.

Figure 5:
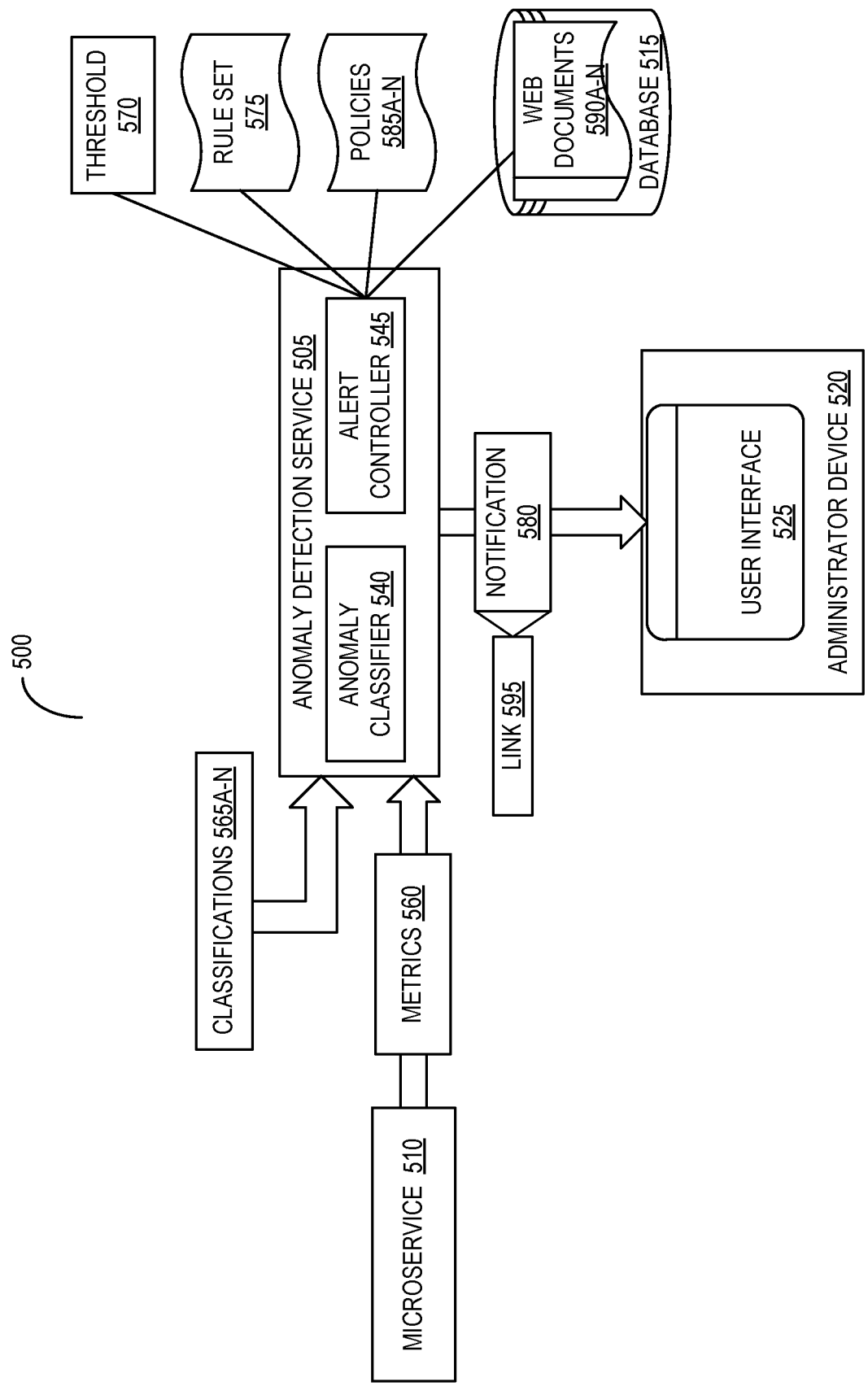
FIG. 5 illustrates a block diagram of an example system for issuing alerts for anomalies in microservices in accordance with an illustrative embodiment.

FIG. 5 depicts a block diagram of a system 500 for issuing alerts for anomalies in microservices. The system 500 may include a microservice 510, a database 515, an administrator device 520, a threshold 570, an anomaly detection service 505, metrics 560, a rule set 575, an alert 580, a set of policies 585A-N, or a set of web documents 590A-N maintained on the database 515. The anomaly detection service 505 may include at least an anomaly classifier 540 or an alert controller 545. Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the microservice 510A, the anomaly detection service 505, the alert 580, or the administrator device 520) may be any computing device comprising one or more processors coupled with memory and software, and capable of performing the various processes and tasks described herein.

With the generation of classifications for a set of metrics, the anomaly classifier 540 may obtain, acquire, or otherwise identify the classifications 565 from the ensemble of models. To identify, the anomaly classifier 540 may count a number of classifications 565 indicating the metrics 560 as anomalous and a number of classifications 565 indicating the metrics 560 as normal. The anomaly classifier 540 may determine or identify whether a majority or minority of the classifications 565 are anomalous. Based on the counts, the anomaly classifier 540 may determine if at least a majority or a minority of the models identifies the classifications 565 as anomalous. A majority of the classifications 565 being identified as anomalous may indicate an anomaly event in a corresponding microservice 510.

When the majority of classifications 565 are anomalous, the alert controller 545 determines whether to proceed with or suppress generation of an alert 585. The alert 585 may be to indicate an anomaly event in the microservice 510. The alert 585 can be a notification message (e.g., Short Messaging Service (SMS), multimedia messaging service (MMS), or email) to indicate to at least a system administrator that the microservice 510 is experiencing an anomaly event. Additional checks may be performed by the alert controller 545 to determine whether to proceed with suppressing or providing the alert 585. When the minority (e.g., less than majority) of classifications 565 are anomalous, the alert controller 545 may refrain from or otherwise suppress generation of at least one notification message 580 (sometimes herein referred to as an alert or a notification).

In some embodiments, the alert controller 545 may determine whether at least one of the set of metrics 560 satisfies a threshold 570. The threshold 570 can determine whether or not to suppress the notification message 580. For example, one or more of the set of metrics 560 may not satisfy the threshold 570. In this example, the notification message 580 may be suppressed for the metric 560 not satisfying the threshold 570. Conversely, one or more of the set of metrics 560 may satisfy the threshold 570. Upon satisfying the threshold 570, the alert controller 545 may not suppress the notification message 580. The threshold 570 can be determined by the alert controller 545.

In some embodiments, the alert controller 545 may determine the threshold 570 with which to compare a respective metric of the set of metrics 560. The alert controller 545 may use a second set of metrics 560 to determine the threshold 570 with which to compare a respective metric of the set of metrics 560. For example, the alert controller 545 may create a statistical analysis of the second set of metrics 560 over a period of time. In some implementations, the second set of metrics 560 can be received prior to the set of metrics 560. The alert controller 545 may determine the threshold 570 based on a percentile of the second set of metrics 560. For example, the alert controller 545 may set the threshold 570 at a 0.995 percentile of the second set of metrics 560. In this example, this 0.995 percentile threshold 570 can be applied to the set of metrics 560. In some implementations, if the set of metrics 560 meets the threshold 570 of 0.995 percentile, the alert controller 545 may not suppress the notification message 580.

In some embodiments, the alert controller 545 may determine whether at least one of the set of metrics 560 satisfies the rule set 575 to avoid false positives. The rule set 575 can include ranges of values for the metrics 560 to generate or suppress the notification message 580. The rule set 575 can include conditions for information of the metrics 560 to satisfy. For example, the rule set 575 can identify when all of the metrics 560 except for "error per minute" is within a threshold (e.g., the threshold 570 or another threshold) and errors per minute is less than 10, when the "errors per minutes" is less than 1% of the "calls per minute" value, when all but one of the metrics 560 is within the threshold and the one metric is below a second threshold, among others. The satisfaction of a rule of the rule set 575 may avoid false positives in anomaly detection. In some implementations, if the metrics 560 satisfy the rule set 575, the alert controller 545 may suppress the notification message 580.

If the metrics 560 do not satisfy the threshold 560 or the rule set 575, the alert controller 545 may suppress the notification message 580 to provide for the microservice 510. Suppressing the notification message 580 may refer to the alert controller 545 not generating the notification message 580, not transmitting the notification message 580, or not displaying the notification message 580 on the user interface 525. Suppression of the notification message 580 may indicate that the microservice 510 is not experiencing an anomaly event. Suppression of the notification message 580 may indicate that the metrics 560 indicate a false positive. In some embodiments, the rule of the rule set 575 or the threshold 570 may correspond to a suppression of the notification message 580. For example, a rule of the rule set 575 could be related to a number of suppressions for a given metric 560 of the microservice 510 over a period of time. Conversely, if the metrics 560 satisfy the threshold 570, the alert controller 545 may produce, output, or otherwise generate the notification message 580 to for the microservice 510 to present via the user interface 525 operating on the administrator device 585. In some implementations, if the metrics 560 do not satisfy the rule set 575, the alert controller 545 may maintain the notification message 580. In this manner, the anomaly detection service 505 has determined that it is not a false positive, and thereby the notification message 580 should be generated.

In some embodiments, the alert controller 545 may determine whether at least one of the set of metrics 560 satisfies a criterion of at least one of a set of policies 585A-N (hereinafter generally referred to as policies 585). Each policy 585 may identify, specify, or otherwise define the criterion to compare against the set of metrics 560. The criterion of the policy 585 may define one or more ranges of values that the metrics 560 are to satisfy for the policy 585 to be selected for application. The policy 585 may also define, specify, or otherwise identify one or more countermeasures to be applied (e.g., including generation and provision of the notification message 580 or triggering restarting of the microservices 510), if the set of metrics 560 satisfy the criterion of the policy 585. The alert controller 545 may perform the determination upon identifying that the majority of classifications 565 indicating that the set of metrics 560 as corresponding to an anomaly event. In some embodiments, the determination of whether the set of metrics 560 satisfies the criteria of the policies 585 may be performed by the alert controller 545 upon determining that metrics 560 satisfy the threshold 560 or the rule set 575 as laid out above. In some embodiments, the determination of whether the set of metrics 560 satisfies the criteria of the policies 585 may be performed by the alert controller 545 independently of or instead of the determination of whether that metrics 560 satisfy the threshold 560 or the rule set 575.

Among the set of policies 585, at least one first policy 585A may include or identify a criteria specifying that: a countermeasure (e.g., restarting) has not been executed on the microservices 510 within a defined period of time (e.g., 1 hour to 3 days); a total number of instances of the microservices 510 running are greater than to a threshold number (e.g., 5 to 10); the total number of instances of the microservices 510 impacted by the anomaly event is greater than a threshold number (e.g., 3 to 8); and/or the percentage of affected instances of the microservices 510 is less than a threshold percentage (e.g., 40 to 60%). The policy 585A may specify the countermeasure as automatically triggering a restart (or reboot) process if the criteria are satisfied.

At least one second policy 585B may include or identify a criteria specifying that: that a countermeasure (e.g., restarting) has not been executed on the microservices 510 within a defined period of time (e.g., 1 hour to 3 days); the total number of instances of the microservices 510 running are less than to a threshold number (e.g., 5 to 10); the total number of instances of microservices 510 impacted by the anomaly event is greater than a threshold number (e.g., 3 to 8); and/or the percentage of affected instances of microservices 510 is less than a threshold percentage (e.g., 40 to 60%). The policy 585B may specify the countermeasure as sending the notification message 580 including an actionable item (e.g., a link) to prompt a system administrator to trigger a restart (or reboot) process if the criteria are satisfied.

At least one third policy 585C may include or identify a criterion specifying that: the reboot process has been executed on the microservices 510 within a defined period of time (e.g., 1 hour to 3 days); and/or the total number of instances of the microservices 510 impacted by the anomaly event is greater than a threshold number (e.g., 3 to 8). The policy 585C may specify the countermeasure as sending the notification message 580 to prompt the system administrator to perform a manual review of the microservices 510 and the network environment for further diagnosis if the criteria are satisfied.

To identify which policy 585 to apply, the alert controller 545 may compare the set of metrics 560 with the criteria of each policy 585. When the metrics 560 satisfy the criteria of one of the policies 585, the alert controller 545 may select or identify the corresponding policy 585 to apply. The alert controller 545 may also identify the countermeasure as defined by the identified policy 585. For example, if the countermeasure has not been executed on the microservices 510 within the defined period of time, a total number of instances of the microservices 510 running are greater than to a threshold number, the total number of instances of the microservices 510 impacted by the anomaly event is greater than a threshold number, and the percentage of affected instances of the microservices 510 is less than a threshold percentage, the alert controller 545 may select the first policy 585A and may identify the corresponding countermeasure.

Continuing on, if the countermeasure has not been executed on the microservices 510 within a defined period of time, the total number of instances of the microservices 510 running are less than to a threshold number, the total number of instances of microservices 510 impacted by the anomaly event is greater than a threshold number, and the percentage of affected instances of microservices 510 is less than a threshold percentage, the alert controller 545 may select the second policy 585B and may identify the corresponding countermeasure. If the reboot process has been executed on the microservices 510 within a defined period of time (e.g., 1 hour to 3 days) and the total number of instances impacted by the anomaly event is greater than a threshold number (e.g., 3 to 8) in accordance with the third policy 585C, the alert controller 545 may select the third policy 585C and may identify the corresponding countermeasure. In contrast, when the metrics 560 do not satisfy any of the criteria, the alert controller 545 may determine that the none of policies 585 are applicable. The alert controller 545 may also refrain from performing any of the countermeasures defined by any of the policies 585.

With the identification of the policy 585 to apply, the alert controller 545 may execute, carry out, or otherwise perform specified countermeasure. When the first policy 585A is identified, the alert controller 545 may perform the countermeasure to automatically carry out or trigger a restart (or reboot) process of the set of microservices 510 affected by the anomaly event. The restart process may include shutting down the instances of the microservices 510, restarting the instances of the microservices 510, and verification of successful restarting of the instances of the microservices 510. The restart process may be performed, without intervention of the system administrator through the administrator device 520. When the first policy 585B is identified, the alert controller 545 may perform the countermeasure to send the notification message 580 identifying the anomaly event in the set of microservices 510. The notification message 580 may direct or prompt the system administrator to invoke the restart process for the microservices 510. When the third policy 585C is identified, the alert controller 545 may to send the notification message 580 identifying the anomaly event in the set of microservices 510. The notification message 580 may direct or prompt the system administrator to further diagnose or examine the microservices 510 or the network environment.

In some embodiments, the alert controller 545 may identify or select at least one from a set of web documents 590A-N(hereinafter generally referred to as web documents 590). Each web document 590 may identify, contain, or otherwise include information on describing, diagnosing, or troubleshooting the anomaly event in the microservices 510. The web documents 590 may have been created by system administrator or users of the microservices 510 or the network. The anomaly detection service 505 may retrieve, obtain, or otherwise receive the web documents 590 for storage and maintenance on the database 515. The web documents 590 may be stored as one or more files (e.g., text file, a document file, hypertext markup language (HTML) file, or an extensible markup language (XML) file) on the database 515. The set of web documents 590 may be indexed, organized, or identified by one or more of: an anomaly type of the anomaly event; an identifier for the microservices 510 (e.g., by application name or service name); or a type of function or transaction in the system, among others.

Using the anomaly event, an identification of the microservices 510 impacted by the anomaly event, and the function, the alert controller 545 may find, or identify, select at least one matching web document 590 from the database 515. The alert controller 545 may select the web document 590 in response to satisfying one of the policies 585 specifying sending of the notification message 580 (e.g., the policies 585B or 585C as described above). Upon identification, the alert controller 545 may add, insert, or otherwise include at least one link 595 to the selected web document 590 into the notification message 580. The link 595 may be an identifier (e.g., a uniform resource locator (URL)) referencing the web document 590 and may be used to access the web document 590 (e.g., via interaction with the URL). The link 595 may be inserted into the notification message 580 prior to sending to the administrator device 520. Examples of the web documents 590 and entering information for the web documents 590 are detailed herein in conjunction with FIG. 7.

Upon receipt, the administrator device 520 may render, display, or otherwise present the user interface 525 for the notification message 580. In some embodiments, the alert controller 545 may also provide information for presentation on the user interface 525. The notification message 580 can be presented on the user interface 525 of an administrator device 520. For example, the notification message 580 may be presented as a prompt on a user interface 525 or an email message in the inbox of a mail agent application on the administrator device 520. In some implementations, the user interface 525 can be a dashboard displaying at least the microservices 510, the application, the notification message 580, the respective function of each microservice 510, the classifications 565, or a set of metrics 560, among others. For example, the dashboard can display the name of the microservice 510, the errors per minute of that microservice 510, the garbage collection count per minute of that microservice 510, the calls per minute of that microservice 510, among other metrics. An example of the dashboard presented via the user interface 525 is detailed herein in conjunction with FIG. 6.

In some embodiments, the administrator device 520 may present the notification message 580 in accordance with the policies 585. When the notification message 580 is to prompt the administrator to invoke the restart process, the administrator device 520 may present the prompt of the notification message 580 through the user interface 525. The prompt may include a user interface element to invoke the restart process and another user interface to forego the restart process, for the system administrator to conduct a separate review. Otherwise, when the notification message 580 is to prompt the administrator to perform an examination, the administrator device 520 may present the prompt of the notification message 580 through the user interface 525, along with information associated with the microservices 510, such as the anomaly event and the metrics 560. The prompt may include information to allow the system administrator to conduct further examination, diagnosis, and troubleshooting of the instances of the microservices 510.

As the restart process is being performed, the alert controller 545 may identify, keep track, or otherwise monitor for a status of the restart process on the microservice 510 (or the set of microservices 510). In some embodiments, the alert controller 545 may monitor the status on each instance of the microservice 510 undergoing the restart process. The status may be one of: shutting down the instances of the microservices 510, restarting the instances of the microservices 510, and verification of successful restarting of the instances of the microservices 510. As the status is updated, the alert controller 545 may provide, transmit, or otherwise send the status of the restart process at the microservices 510 to the administrator device 520. Upon receipt, the administrator device 520 may present the status of the restart process through the user interface 525.

In this manner, microservice anomalies can be more efficiently and precisely detected and displayed. Detecting and displaying anomalies by these means can reduce the use of computational resources through preventing false positive alerts from being generated and presented. The anomaly detection service may use the ensemble of models to reduce false positives at several points (e.g., during modeling by the models, classification by the mode applier, and suppression by the anomaly classifier and the alert controller). Additionally, the classification of the metrics by the anomaly detection service can create a history of anomalous microservices or metrics. These facets can lend themselves to providing concise information to a system administrator. More efficient anomaly detection can lead to faster resolution of problematic microservices. This can create a framework to monitor the performance of critical microservices and trigger alerts proactively whenever the microservice's metrics seem anomalous. This framework can thereby improve the functionality of the application and the human-computer interaction by reducing computational resources spent on malfunctioning microservices by more quickly targeting and resolving failures.

Figure 6:
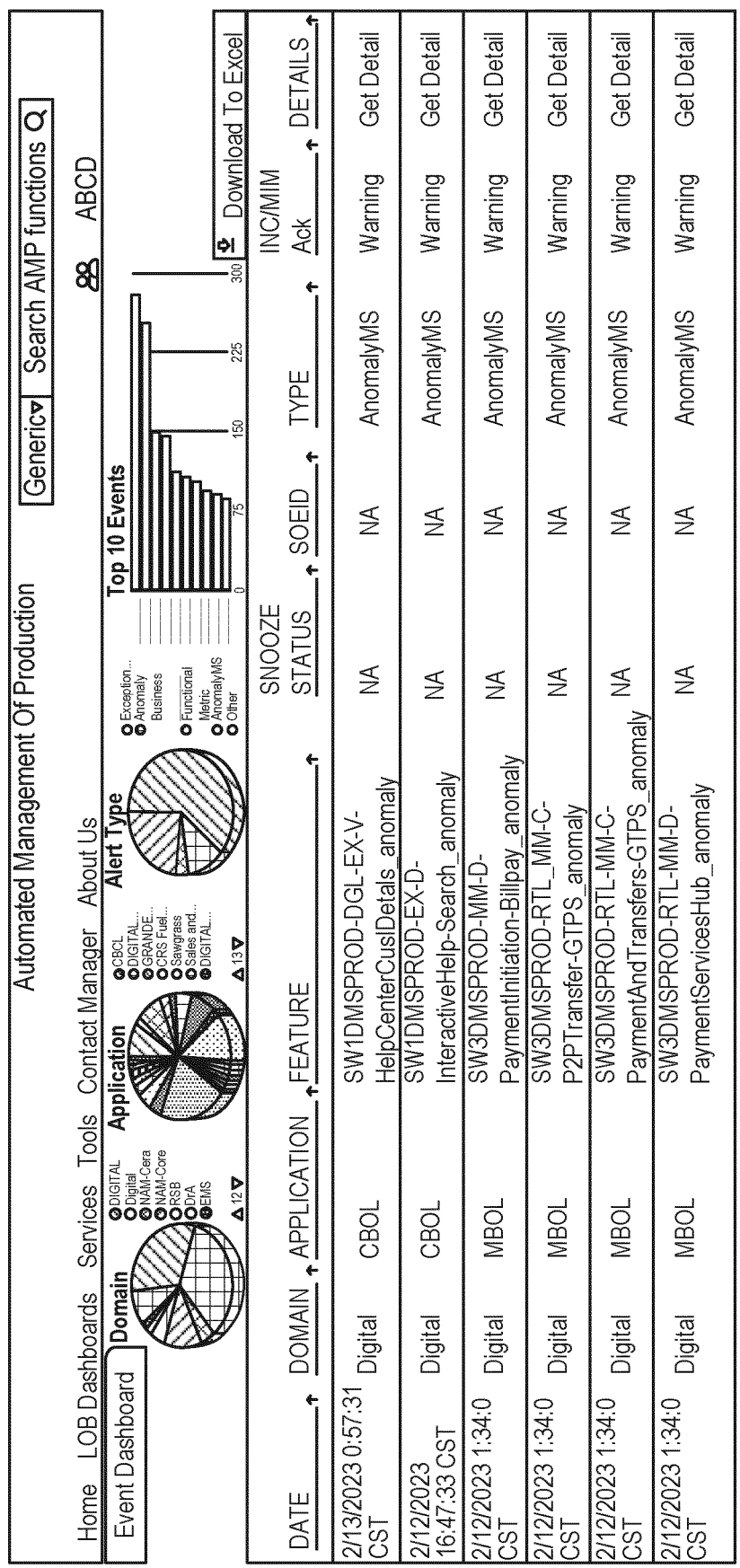
FIG. 6 illustrates a dashboard for microservice anomaly detection in accordance with an illustrative embodiment.

FIG. 6 depicts a dashboard 600 for microservice anomaly detection. The dashboard 600 can be an example dashboard that may be generated by an administrator device. The information displayed by the dashboard 600 may be populated at least from a database of the system, the anomaly detection service (including at least the alert controller, the metric aggregator, the model applier, or the model trainer). The dashboard 600 may display the metrics, the microservice (e.g., an identifier of the microservice), the classifications generated by the models, a timestamp, the alert generated by the alert controller, or details related to an anomaly, among others. For example, the dashboard 600 may depict each anomaly event detected by the system. In some embodiments, the dashboard 600 can show details (e.g., type of anomaly, time of anomaly, microservices affected, among others) and volume of each anomaly event. Each anomaly event displayed may contain a feature. A feature can be indicative of the location of the anomaly. For example, a feature can indicate a function call of the microservice that may be the source of the anomaly event.

The dashboard 600 may display charts and graphs (e.g., pie charts, bar graphs, histograms, etc.) of information depicted in the dashboard 600. The dashboard 600 may depict a pie chart showing the percentage of alert types, or a bar graph indicating the most frequent anomaly events. For example, a pie chart may indicate the applications experiencing the most anomaly events within their respective microservices. A pie chart may exhibit a percentage of the alert types (e.g., an exception, an anomaly event, among others). The charts and graphs may be user customizable.

For example, a system administrator may choose the metrics, microservices, or other data of the dashboard 600 to make graphs of. As an illustrative example, the system administrator may select a microservice and its top ten anomaly events for display in a bar graph showing the relation of frequency of each anomaly event to the other for a period of time. In some embodiments, the dashboard 600 can include a snooze feature. The snooze feature may enable a system administrator to suppress an alarm presented on the dashboard 600. The snooze feature may enable a time-based suppression. For example, a system admin may choose to snooze an alarm for five minutes, 24 hours, or another period of time. The snooze feature may enable a switched snooze, wherein the alert is suppressed until the system administrator chooses to remove the suppression.

Figure 7C:
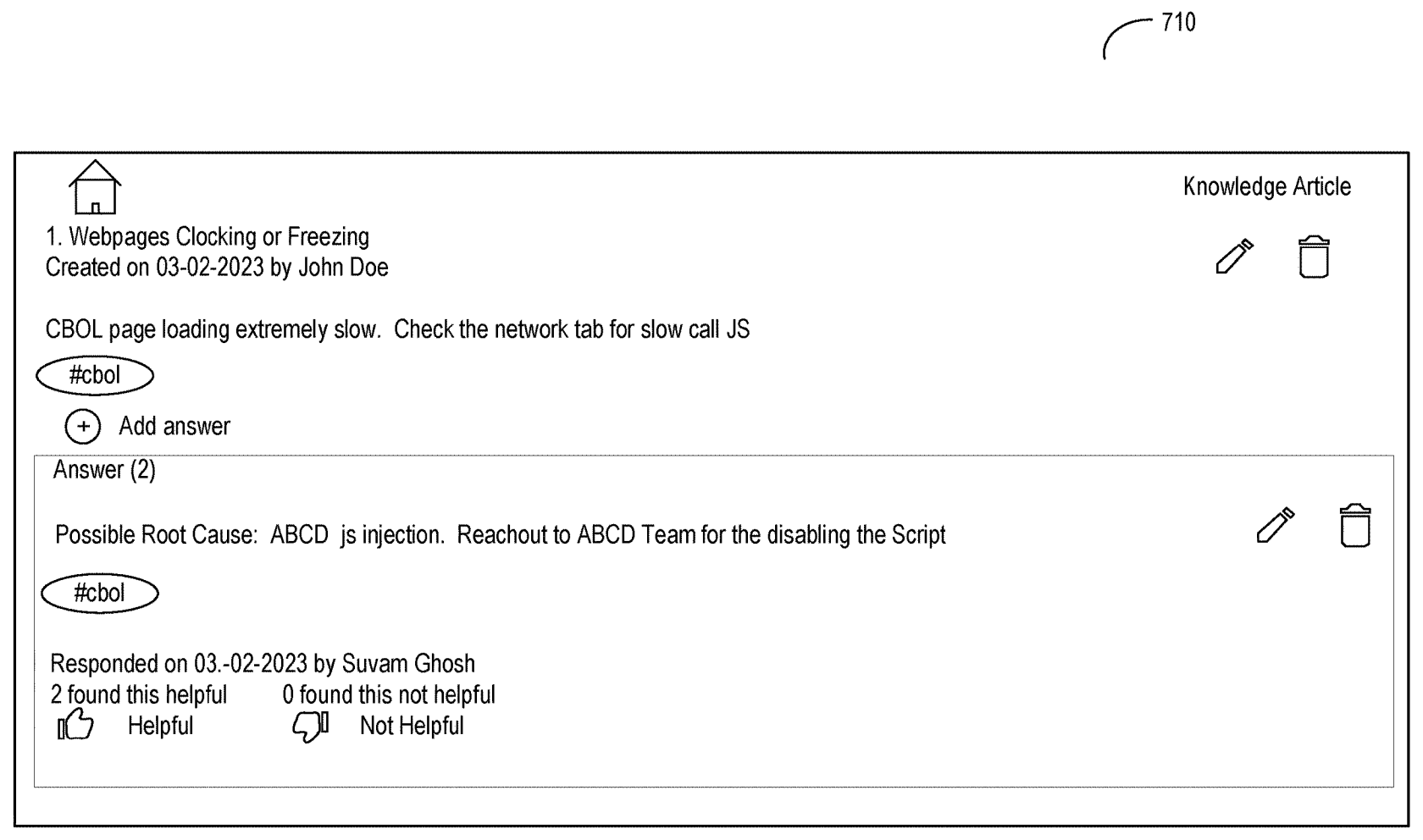

FIGS. 7A-C illustrate screenshots of user interfaces 700-710 to access web documents providing information on anomalies in microservice. The user interface 700 may include a set of user interface elements to enter information to create a web document (also referred herein as a knowledge article). The information may include a type of organization, a name of the application, a category, article title, and a description of the problem and solution, among others. The user interface 705 may include a list of web articles on various issues faced at various microservices. The list also includes a number of answers, a reference link, and a rating indicating a degree of helpfulness from other users, among others. The user interface 710 may include a presentation of one of the web documents, identifying an issue (e.g., "clocking and freezing" with a certain web application), one or more solutions to the issue, as well as a degree of helpfulness, among others.

Figure 8:
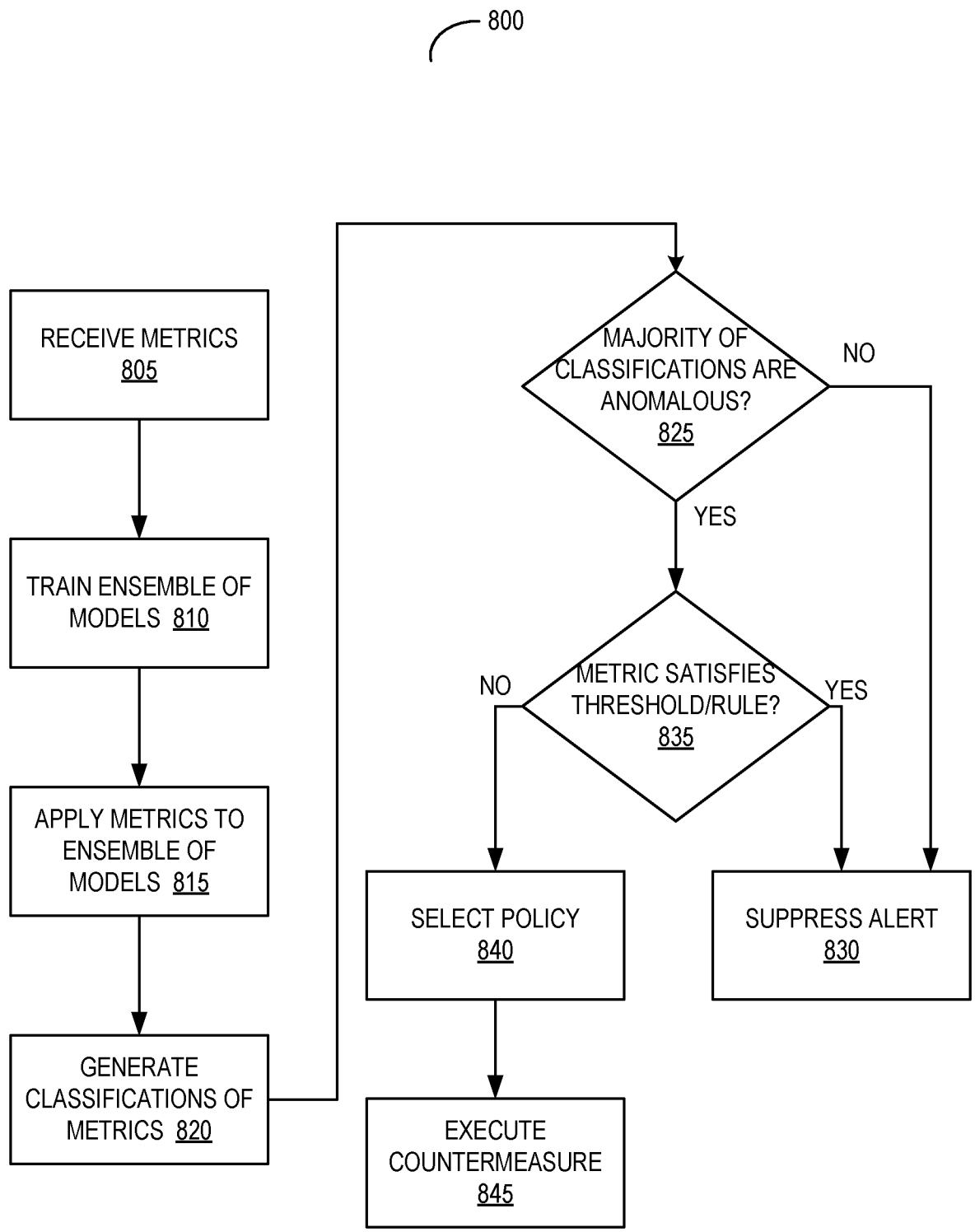
FIG. 8 illustrates a flow diagram of an example method of identifying anomalies in microservices with an illustrative embodiment.

FIG. 8 depicts a flow diagram of an example method of identifying anomalies in microservices. Embodiments may include additional, fewer, or different operations from those described in the method 800. The method 800 may be performed by a server executing machine-readable software code, though it should be appreciated that the various operations may be performed by one or more computing devices and/or processors. At step 805, the server receives metrics. The server may receive metrics from one or more microservices. The metric aggregator may aggregate the metrics received from the one or more microservices. The metric aggregator may perform any number of operations on the metrics, including storing the metrics in the database, filtering the metrics, removing null values from the metrics, among others.

At step 810, the server trains an ensemble of models. The ensemble of models can be trained by the model trainer using at least a subset of the metrics received by the metric aggregator. The ensemble of models can include at least two or more machine learning models. Each of the machine learning models can be a different machine learning model and can each be trained using the subset of metrics. At step 815, the server applies the metrics to the ensemble of models. The model applier can apply the metrics, including or excluding the subset of metrics, to each model of the ensemble. Apply the metrics can refer to feeding the metrics to each model. At step 820, the server generates classifications of metrics. The model applier can generate classifications of the metrics using the trained models. The classifications can include at least a normal classification or an anomalous classification. In some embodiments, the classifications can include an exception classification.

At step 825, the server determines whether a majority of the classifications are anomalous. The server can determine whether a majority of classifications are anomalous using a majority voting of the models. For example, if a majority (e.g., more than 50%) of the models classify a metric as anomalous, the metric can be determined to be anomalous. In some implementations, the number of models of the ensemble are three. At step 830, if the majority of classifications are not anomalous, the server can suppress the alert. At step 835, if the majority of classifications are anomalous, the server determines whether the metrics satisfy a threshold or a rule. The metrics can satisfy a threshold relating to historical data of the microservice. For example, the metrics for a microservice can be aggregated over a time period and used to determine a statistical distribution of the metrics. The threshold can be at a percentile of the historical metrics. In some embodiments, the service may determine whether the metrics satisfy a rule to avoid false positives. The rule of the rule set can relate at least to conditionals of the values of the metrics. At step 830, if the metrics do not satisfy the threshold, the server suppresses the alert. Suppressing the alert can refer to the alert controller not generating an alert or not transmitting the alert to the system admin. The alert can be suppressed if the server determines the alert to be a false positive. At step 840, if the metrics satisfy a threshold, the service may select a policy from a set of policies based on the metrics. Each policy may identify a criterion defining a range of metrics to satisfy for selection of the policy and may specify a countermeasure to be executed if the criterion of the policy is satisfied. The service may compare the values of the metrics to identify the policy to apply. At step 845, the service may execute the countermeasure as specified by the policy. The countermeasure may include, for example, automatically performing a restart process of the affected microservices without manual intervention, prompting a system administrator to invoke the restart process, or prompting the system administrator to perform further examination of the impacted microservices, among others.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by a server, a first plurality of metrics over a first time period from a defined set of microservices for a function;
   applying, by the server, the first plurality of metrics to an ensemble of anomaly detection models to generate a plurality of classifications, each of the plurality of classifications indicating the first plurality of metrics as one of anomalous or normal from a respective model of the ensemble of anomaly detection models, wherein the ensemble of anomaly detection models is trained using a second plurality of metrics over a second time period;
   identifying, by the server, a majority of the plurality of classifications as corresponding to an anomaly event in the defined set of microservices;
   determining, by the server, responsive to identifying the majority of the plurality of classifications as corresponding to the anomaly event, that (i) a number of instances of the defined set of microservices affected by the anomaly event is greater than a first threshold number and (ii) a total number of instances of the defined set of microservices is less than a second threshold number in accordance with a criterion of a policy of a plurality of policies, each of the plurality of policies identifying a respective countermeasure to address the anomaly event; and
   performing, by the server, a countermeasure identified by the policy to provide an alert message identifying the anomaly event to prompt an administrator to invoke restarting of the defined set of microservices for the function.

2. The method of claim 1, wherein determining further comprises determining that (i) a number of instances of the defined set of microservices affected by the anomaly event is less than a first threshold number and (ii) a total number of instances of the defined set of microservices is greater than or equal to a second threshold number, in accordance with a second criterion of a second policy, and
   wherein performing further comprises performing a second countermeasure including a restart of the defined set of microservices without approval from an administrator.

3. The method of claim 1, wherein determining further comprises determining that (i) a number of instances of the defined set of microservices affected by the anomaly event is greater than a threshold number and (ii) a time elapsed since a restarting of the defined set of microservices is less than a threshold time, in accordance with a second criterion of a second policy, and
   wherein performing further comprises performing a second countermeasure to provide an alert message identifying the anomaly event to prompt the administrator for examination.

4. The method of claim 1, wherein applying further comprises:
   applying a natural language processing (NLP) algorithm to log data identifying a plurality of events associated with the defined set of microservices in carrying out the function; and identifying, from applying the NLP algorithm to the log data, an exception in at least one of the plurality of events of an exception type associated with the anomaly event.

5. The method of claim 4, further comprising generating, by the server, for the plurality of classifications, a classification to identify the exception in the defined set of microservices as one of anomalous or normal based on the exception type.

6. The method of claim 1, further comprising receiving, by the server, via a user interface, a web document to include in a plurality of web documents maintained on a database, each of the plurality of web documents identified using at least one of (i) an anomaly type, (ii) one or more microservices, or (iii) a function type.

7. The method of claim 1, further comprising selecting, by the server, responsive to identifying the majority of the plurality of classifications as corresponding to the anomaly event, a web article from a plurality of web documents on a database based at least one of: (i) an anomaly type of the anomaly event, (ii) the defined set of microservices, or (iii) the function; and wherein performing further comprises performing the countermeasure to provide an identification of the web document.

8. The method of claim 1, further comprising:
determining, by the server, responsive to identifying the majority of a second plurality of classifications as corresponding to a second anomaly event, that none of a third plurality of metrics satisfies any criterion of any policy of the plurality of policies; and
refraining, by the server, from performing any countermeasure identified by any policy of the plurality of policies, responsive to determining that none of a third plurality of metrics satisfies any criterion.

9. The method of claim 1, wherein the defined set of microservices further comprises a group of microservices invoked in response to carry out a function.

10. A system, comprising:
a server having one or more processors coupled with memory, configured to
receive a first plurality of metrics over a first time period from a defined set of microservices for a function;
apply the first plurality of metrics to an ensemble of anomaly detection models to generate a plurality of classifications, each of the plurality of classifications indicating the first plurality of metrics as one of anomalous or normal from a respective model of the ensemble of anomaly detection models, wherein the ensemble of anomaly detection models is trained using a second plurality of metrics over a second time period;
identify a majority of the plurality of classifications as corresponding to an anomaly event in the defined set of microservices;
determine, responsive to identifying the majority of the plurality of classifications as corresponding to the anomaly event, that (i) a number of instances of the defined set of microservices affected by the anomaly event is greater than a first threshold number and (ii) a total number of instances of the defined set of microservices is less than a second threshold number in accordance with a criterion of a policy of a plurality of policies, each of the plurality of policies identifying a respective countermeasure to address the anomaly event; and perform a countermeasure identified by the policy to provide an alert message identifying the anomaly event to prompt an administrator to invoke restarting of the defined set of microservices for the function.

11. The system of claim 10, wherein the server is further configured to:
determine that (i) a number of instances of the defined set of microservices affected by the anomaly event is less than a first threshold number and (ii) a total number of instances of the defined set of microservices is greater than or equal to a second threshold number, in accordance with a second criterion of a second policy, and
perform a second countermeasure including a restart of the defined set of microservices without approval from an administrator.

12. The system of claim 10, wherein the server is further configured to:
determine that (i) a number of instances of the defined set of microservices affected by the anomaly event is greater than a threshold number and (ii) a time elapsed since a restarting of the defined set of microservices is less than a threshold time, in accordance with a second criterion of a second policy, and
perform a second countermeasure to provide an alert message identifying the anomaly event to prompt the administrator for examination.

13. The system of claim 10, wherein the server is further configured to:
apply a natural language processing (NLP) algorithm to log data identifying a plurality of events associated with the defined set of microservices in carrying out the function; and
identify, from applying the NLP algorithm to the log data, an exception in at least one of the plurality of events of an exception type associated with the anomaly event.

14. The system of claim 13, wherein the server is further configured to generate, for the plurality of classifications, a classification to identify the exception in the defined set of microservices as one of anomalous or normal based on the exception type.

15. The system of claim 10, wherein the server is further configured to receive, via a user interface, a web document to include in a plurality of web documents maintained on a database, each of the plurality of web documents identified using at least one of (i) an anomaly type, (ii) one or more microservices, or (iii) a function type.

16. The system of claim 10, wherein the server is further configured to:
select, responsive to identifying the majority of the plurality of classifications as corresponding to the anomaly event, a web article from a plurality of web documents on a database based at least one of: (i) an anomaly type of the anomaly event, (ii) the defined set of microservices, or (iii) the function; and
perform the countermeasure to provide an identification of the web document.

17. The system of claim 10, wherein the server is further configured to:
determine, responsive to identifying the majority of a second plurality of classifications as corresponding to a second anomaly event, that none of a third plurality of metrics satisfies any criterion of any policy of the plurality of policies; and
refrain from performing any countermeasure identified by any policy of the plurality of policies, responsive to determining that none of a third plurality of metrics satisfies any criterion.

18. The system of claim 10, wherein the defined set of microservices further comprises a group of microservices invoked in response to carry out a function.

\* \* \* \* \*